United States Patent
Wang et al.

(10) Patent No.: US 12,547,940 B2
(45) Date of Patent: Feb. 10, 2026

(54) MACHINE LEARNING INTEGRATION IN LOW-CODE NO-CODE APPLICATION DEVELOPMENT

(71) Applicant: SAP SE, Walldorf (DE)

(72) Inventors: Qiu Shi Wang, Singapore (SG); Lin Cao, Singapore (SG)

(73) Assignee: SAP SE, Walldorf (DE)

( * ) Notice: Subject to any disclaimer, the term of this patent is extended or adjusted under 35 U.S.C. 154(b) by 286 days.

(21) Appl. No.: 18/193,315

(22) Filed: Mar. 30, 2023

(65) Prior Publication Data

US 2024/0330747 A1    Oct. 3, 2024

(51) Int. Cl.
| | |
|---|---|
| *G06N 20/00* | (2019.01) |
| *G06F 3/0482* | (2013.01) |
| *G06F 3/04842* | (2022.01) |
| *G06F 3/04847* | (2022.01) |
| *G06F 3/0486* | (2013.01) |

(52) U.S. Cl.
CPC ........... *G06N 20/00* (2019.01); *G06F 3/0482* (2013.01); *G06F 3/04847* (2013.01); *G06F 3/0486* (2013.01)

(58) Field of Classification Search
CPC ..... G06N 20/00; G06F 3/0482; G06F 3/0486; G06F 3/04847
See application file for complete search history.

(56) References Cited

U.S. PATENT DOCUMENTS

| | | | | |
|---|---|---|---|---|
| 11,269,889 B1 * | 3/2022 | Aversano | ............ | G06F 16/2458 |
| 11,755,559 B1 * | 9/2023 | Tankersley | .......... | G06F 16/2358 |
| | | | | 707/694 |
| 2003/0115370 A1 * | 6/2003 | Jacquin | ..................... | G06F 8/34 |
| | | | | 719/310 |
| 2009/0210855 A1 * | 8/2009 | Ramanathan | ............. | G06F 8/36 |
| | | | | 717/122 |
| 2011/0167408 A1 * | 7/2011 | Harmon | .................. | G06F 9/451 |
| | | | | 717/121 |

(Continued)

FOREIGN PATENT DOCUMENTS

WO    WO-2014126853 A1 *    8/2014    ........... G06F 3/0481

OTHER PUBLICATIONS

Spring Boot, "Configuration Metadata", published on Mar. 3, 2010 to https://docs.spring.io/spring-boot/specification/configuration-metadata/index.html, retrieved Mar. 5, 2025. (Year: 2010).*

*Primary Examiner* — Shourjo Dasgupta
(74) *Attorney, Agent, or Firm* — Fountainhead Law Group, PC

(57) ABSTRACT

An application development graphical user interface which includes a drag-and-drop canvas area is provided. User interface elements are configured to be dragged and dropped into the canvas area to design a client application graphical user interface including a filter or a sorter. A configuration panel of the application development user interface providing options and fields for configuring sorter or filter configuration options and for configuring machine learning service configuration options. Machine learning service metadata is generated for the client application. The client application metadata for the client application is deployed and the client application configured present recommendations based on inputs to the filter or sorter using the machine learning service.

17 Claims, 5 Drawing Sheets

(56) References Cited

U.S. PATENT DOCUMENTS

| | | | |
|---|---|---|---|
| 2017/0115968 A1* | 4/2017 | Fukala | G06F 16/25 |
| 2018/0349778 A1* | 12/2018 | Pèrez Àlvarez | G06F 16/212 |
| 2020/0125586 A1* | 4/2020 | Rezaeian | G06F 3/048 |
| 2020/0167138 A1* | 5/2020 | Schaude | G06F 16/951 |
| 2020/0234242 A1* | 7/2020 | Parks | G06F 16/906 |
| 2020/0301678 A1* | 9/2020 | Burman | G06F 9/541 |
| 2020/0380432 A1* | 12/2020 | Wang | G06F 3/04817 |
| 2020/0382616 A1* | 12/2020 | Vaishampayan | H04L 67/59 |
| 2022/0107802 A1* | 4/2022 | Rao | G06F 16/907 |
| 2023/0206329 A1* | 6/2023 | Cella | G06Q 20/36 |
| 2023/0214925 A1* | 7/2023 | Cella | G06Q 30/06 705/37 |
| 2024/0184416 A1* | 6/2024 | Zeng | G06F 11/368 |

\* cited by examiner

MACHINE LEARNING INTEGRATION IN LOW-CODE NO-CODE APPLICATION DEVELOPMENT

BACKGROUND

The present disclosure pertains machine learning and in particular to integration of machine learning in low-code no-code application development.

Computer software applications are traditionally developed using an integrated development environment (IDE), which is itself a software application, typically having a graphical user interface, that provides tools for computer programmers, such as computer programming code editing tools, static code testing tools, software building tools, and dynamic software testing tools, for example. An IDE may be configured with rules for various programming languages and use those rules to provide features for computer programmers coding in those programming languages. However, software developers using traditional IDEs, or coding otherwise, still require knowledge of the programming language and computing software coding practices. That is, the software application developer must be a computer programmer.

"Low-code/no-code" (LCNC) software development applications have become an alternative to traditional computer programming IDEs. LCNC development applications provide graphical user interfaces to enable non-programmer users to develop software applications without having to write code line by line. "Low-code" software development may require a user to have understanding or familiarity with computer programming languages and involve some amount of manual coding. "No-code" software development may enable a user without understanding or familiarity with computer programming languages to develop a software application without manually coding in a programming language.

Software developed using a LCNC software development application may require a developer with technical expertise to step-in to program certain aspects of the software. People with such expertise are not always available. It would be advantageous if a LCNC software development application could provide additional tools and features to enable non-expert users to design and implement more functionality using LCNC software development applications.

The present disclosure addresses these issue and others, as further described below.

SUMMARY

Some embodiments provide a computer system, comprising one or more processors and one or more machine-readable medium coupled to the one or more processors, and storing computer program code comprising sets instructions executable by the one or more processors. The instructions are executable to provide an application development graphical user interface including a drag-and-drop canvas area, a control panel, and a configuration panel. The control panel includes a plurality of available user interface elements configured to be dragged and dropped into the canvas area to design a client graphical user interface of a client application. The available user interface elements include a filter user interface element or a sorter user interface element. The filter user interface element is configurable to filter data within the client graphical user based on filtering options interface. The sorter user interface element configurable to sort data within the client graphical user based on sorting options. The configuration panel provides options and fields for configuring properties of user interface elements.

The instructions are further executable to generate filter metadata or sorter metadata for the client application, respectively, in response to the filter user interface element or the sorter user interface element being dragged from the control panel and being selected or dropped onto the canvas area. The filter metadata or sorter metadata are configured to be parsed by the client application to render the filter user interface element or the sorter user interface element, respectively, in the client graphical user interface.

The instructions are further executable to provide sorter or filter configuration options in the configuration panel in response to the filter user interface element or the sorter user interface element being selected or dropped onto the canvas area. The sorter or filter configuration options in the configuration panel including the filtering options or the sorting options and machine learning service configuration options.

The instructions are further executable to generate machine learning service metadata for the client application in response to configuration input configuring the machine learning service configuration options. The machine learning service metadata configured to be parsed by the client application to obtain inferences from a machine learning model of a machine learning service.

The instructions are further executable to deploy client application metadata for the client application. The client application metadata including the filter metadata or sorter metadata and the machine learning service metadata. The client application is configured to present recommendations based on the inferences and based on inputs to the filter user interface element and/or the sorter user interface element.

Some embodiments provide one or more non-transitory computer-readable medium storing computer program code. The computer program code comprises sets of instructions to provide an application development graphical user interface including a drag-and-drop canvas area, a control panel, and a configuration panel. The control panel includes a plurality of available user interface elements configured to be dragged and dropped into the canvas area to design a client graphical user interface of a client application. The available user interface elements including a filter user interface element or a sorter user interface element. The filter user interface element is configurable to filter data within the client graphical user based on filtering options. The sorter user interface element configurable to sort data within the client graphical user based on sorting options. The configuration panel providing options and fields for configuring properties of user interface elements.

The computer program code comprises further sets of instructions to generate filter metadata or sorter metadata for the client application, respectively, in response to the filter user interface element or the sorter user interface element being arranged onto the canvas area, the filter metadata or sorter metadata configured to be parsed by the client application to render the filter user interface element or the sorter user interface element, respectively, in the client graphical user interface.

The computer program code comprises further sets of instructions to provide sorter or filter configuration options in the configuration panel in response to the filter user interface element or the sorter user interface element being arranged on the canvas area. The sorter or filter configuration options in the configuration panel include the filtering options or the sorting options and machine learning service configuration options.

The computer program code comprises further sets of instructions to generate machine learning service metadata for the client application in response to configuration input configuring the machine learning service configuration options. For example, a configuration input may include an identifier of the machine learning service input into a text field (e.g., a text field within the configuration panel). An example configuration input of "SimilarItems.service" is given below. The metadata machine learning service generated in response to this input may be "AIService": "/MyMDKApp/Services/SimilarItems.service" as shown in the example below. The machine learning service metadata is configured to be parsed by the client application to obtain inferences from a machine learning model of a machine learning service.

The computer program code comprises further sets of instructions to deploy client application metadata for the client application. The client application metadata includes the filter metadata or sorter metadata and the machine learning service metadata. The client application is configured to present recommendations based on the inferences and based on inputs to the filter user interface element or the sorter user interface element.

Some embodiments provide a computer-implemented method. The method includes providing an application development graphical user interface including a drag-and-drop canvas area, a control panel, and a configuration panel. The control panel includes a plurality of available user interface elements configured to be dragged and dropped into the canvas area to design a client graphical user interface of a client application. The available user interface elements include a filter user interface element or a sorter user interface element. The filter user interface element is configurable to filter data within the client graphical user based on filtering options interface, The sorter user interface element configurable to sort data within the client graphical user based on sorting options. The configuration panel provides options and fields for configuring properties of user interface elements.

The method further includes generating filter metadata or sorter metadata for the client application, respectively, in response to the filter user interface element or the sorter user interface element being arranged on the canvas area. The filter metadata or sorter metadata configured to be parsed by the client application to render the filter user interface element or the sorter user interface element, respectively, in the client graphical user interface.

The method further includes providing sorter or filter configuration options in the configuration panel in response to the filter user interface element or the sorter user interface element being arranged on the canvas area. The sorter or filter configuration options in the configuration panel include the filtering options or the sorting options and machine learning service configuration options.

The method further includes generating machine learning service metadata for the client application in response to configuration input configuring the machine learning service configuration options. The machine learning service metadata configured to be parsed by the client application to obtain inferences from a machine learning model of a machine learning service.

The method further includes deploying client application metadata for the client application, the client application metadata including the filter metadata or sorter metadata and the machine learning service metadata. The client application configured to present recommendations based on the inferences and based on inputs to the filter user interface element or the sorter user interface element.

The following detailed description and accompanying drawings provide a better understanding of the nature and advantages of the present disclosure.

DETAILED DESCRIPTION

Figure 1:
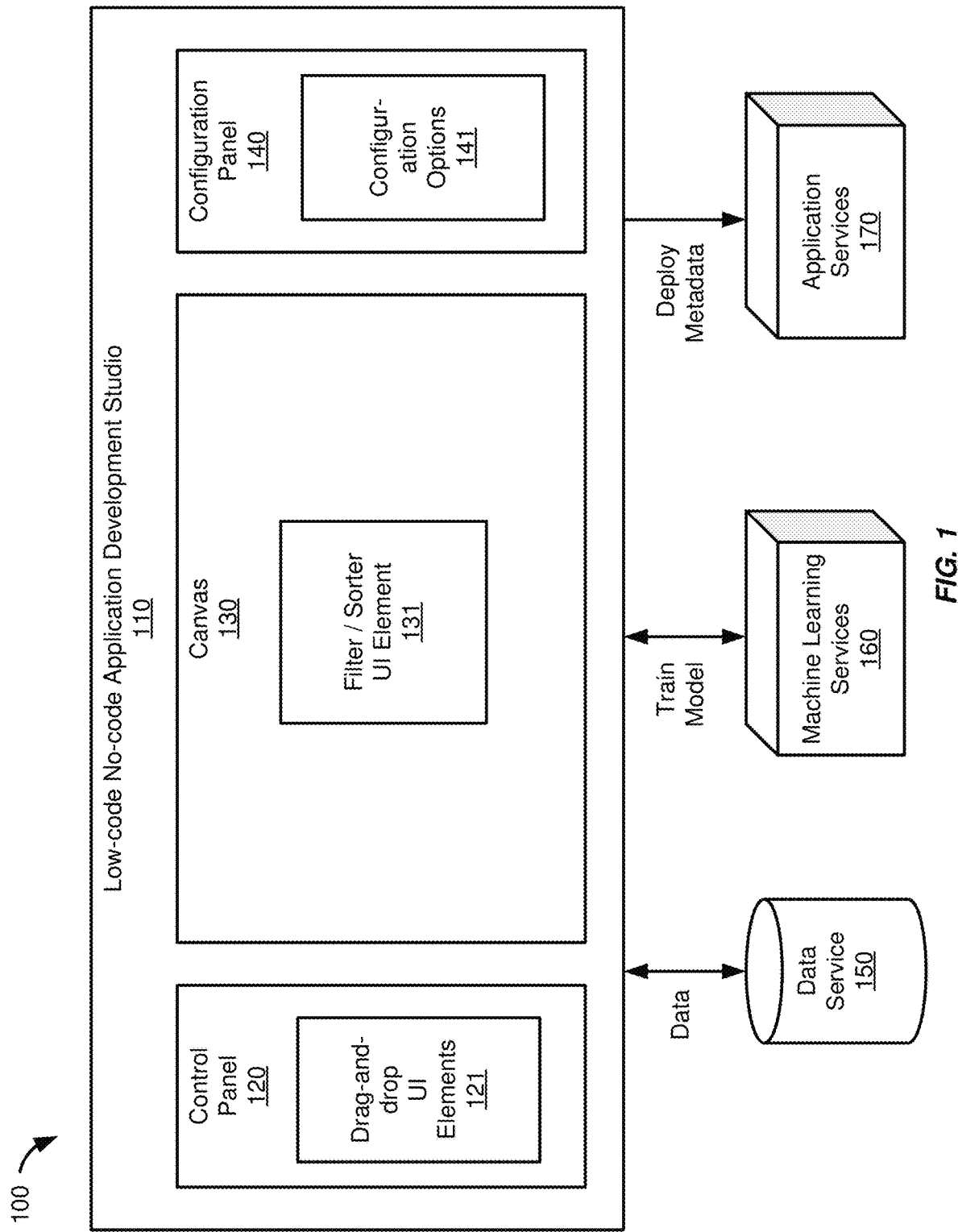
FIG. 1 shows a diagram of a low-code no-code application development studio providing machine learning integration, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. As used herein, the terms "first," "second," "third," "fourth," "fifth," "sixth," "seventh," "eighth," "ninth," "tenth," etc., do not necessarily indicate an ordering or sequence unless indicated. These terms, as used herein, may simply be used for differentiation between different objects or elements.

As mentioned above, software developed using a low-code no-code (LCNC) software development application may still require a developer with technical expertise to step-in to program certain aspects of the software, even though a non-technical user may design and build much of the application using the low-code no-code approach. For example, a developer with artificial intelligence expertise may be needed to design, train, and build machine learning models to be manually integrated with the software otherwise developed using the LCNC approach. There is a need to provide for machine learning training and integration with LCNC applications using the graphical user interface of an application development studio without the user being required to manually code, program, or otherwise provide text input formatted in a programming language.

The present disclosure addresses the issues mentioned above and provides techniques such an application development studio which enables users user to train and integrate machine learning models in their application designs without manually coding, programming, or otherwise provide text input formatted in a programming language.

The techniques described herein provide low-code/no-code development technology for an intelligent and multi-experience sorter and filter driven by metadata. FIG. 1 shows a diagram 100 of a low-code no-code application development studio 110 providing machine learning integration, according to an embodiment. The application development studio 110 includes a control panel 120, a canvas area 130, and a configuration panel 140. In some embodiments the application development studio 110 may be a cloud application provided by a cloud computing platform. The application development studio may be in communication with a data service 150, machine learning services 160, and application services 170, which may also be provided by the cloud computing platform in some embodiments.

The control panel 120 includes a plurality of drag-and-drop user interface (UI) elements 121. The UI elements 121 may include one or more of a filter, a sorter, a toolbar item, an action bar item, a text section, a button, a date picker, a document, a duration picker, an extension, and inline signature capture, a lister picker, and a note, for example.

The application development studio 110 provides a graphical user interface which enables a low-code/no-code developer to drag and drop the user interface elements 121 from the control panel 120 into the canvas area 130. For example, a filter or sorter UI element 131 may be arranged on the canvas area 130. For example, the filter or sorter UI element 131 may be dragged from the control panel 120 and dropped into the canvas area 130. The filter/sorter UI element 131 may be a UI element that may be configured to filter data received from the data service 150, or it may be configured to sort data received from the data service 150, or both filter and sort such data.

The configuration panel 140 provides a plurality of configuration options 141 for configuring the UI elements dropped into the canvas area 130. For example, in response to the user selecting the filter/sorter UI element 131 within the canvas area 130, or in response to the user dropping the filter/sorter UI element 131 into the canvas area, the configuration panel 140 may present configuration options for configuring the filter/sorter UI element 131. For example, the configuration options 141 may include appearance configuration options (e.g., a caption or label), behavior configuration options (e.g., allowing an empty selection, allowing multiple selection, enabling editing, and enabling visibility) data configuration options (e.g., options to bind, or create a connection with, a data service such as data service 150), and machine learning configuration options (e.g., training data source selection, training configuration options, and options to bind, or create a connection with, a machine learning service such as machine learning services 160.

The low-code no-code application development studio 110 may be configured to generate metadata for the application being designed as UI elements are added to the canvas 130 and as configuration options 141 are set or modified in the configuration panel. The metadata may be formatted in a hierarchical structure. The metadata may be in JavaScript Object Notation (JSON) format. While the metadata may be formatted as code or in a programming language, the metadata does not need to be manually input by the user. Instead, the metadata is automatically generated by the low-code no-code application development studio 110 without the user manually coding, programming, or providing input in a programming language.

The user can provide graphical user interface inputs to the configuration panel in order to connect to (e.g., bind) with the machine learning services 160 to set training data (e.g., data received from the data service 150) and to configure training options. The machine learning services 160 can train and build a machine learning model based on the training data. The machine learning model hosted by the machine learning services 160 may be configured to provide recommendations based on data being filtered or sorted by the filter/sorter UI element 131 during runtime (see FIG. 4 and the corresponding description below).

The application development studio 110 is configured to generate the metadata for the application being designed and deploy the metadata to application service 170, which may be provided on a cloud computing platform. During application runtime, a multi-experience client application may receive the metadata from the application services 170 and use it to render the sorter and filter UI element 131 for runtime. The client application may also consume the data services 150 and the machine learning services 160 (e.g., personalized recommendation machine learning model). As used herein, the term "multi-experience" client refers to a client application which is available on multiple platforms (e.g., mobile device, web application, desktop application, etc.) with native UI rendering and native user experience support. That is, the same metadata may be used to render appropriate user interfaces for different devices having different displays and capabilities.

Features and advantages of this low-code/no-code approach include lowering the requirement for the developer, enabling non-professional developers to design applications having complex filter and sorters integrated with machine learning services by using a drag and drop graphical user interface. Furthermore, the automatically generated metadata for the application provides a consistent user experience across various digital devices and platforms (e.g., web, mobile, wearables, etc.).

An example workflow of this low-code/no-code approach is now provided. First, a user may use a graphical user interface (GUI) of the application development studio 110 to drag and drop user interface elements 121 from the control panel 120 to the canvas 130.

Then the user can use the GUI of the application development studio 110 to connect the data service 150 using configuration options 141 in the configuration panel 140. For example, the user may input an identifier of the data service to a text field or select a data service from a selection menu.

After connecting to the data service 150, data may be retrieved from the data service and this data may be prepared (e.g., labeled) to use as training data for training a machine learning model (e.g., training a model to provide recommendations based on data being filtered or sorted).

The user can use the GUI of the application development studio 110 to connect to the machine learning services 160 using configuration options 141 in the configuration panel 140. For example, the user may input an identifier of the machine service to a text field or select a data service from a selection menu. Example application metadata showing the corresponding metadata for connecting the data services 150 and for connecting the machine learning services 160 is given below.

After preparing the training data the application development studio 110 may connect to the machine learning services 160 and configure a machine learning model training job. The application development studio 110 may upload training data to the machine learning services 160 and trigger the training job.

After the model has been trained by the machine learning services 160, it can deploy the machine learning model. For example, the machine learning model may provide next-item recommendations or similar-item recommendations for items being filtered or sorted by the client application. A table of example inference options for machine learning models provided by machine learning services 160 is given below.

| Inference Option | Input |
| --- | --- |
| Next-item recommendations | List of multiple item IDs. |
| Similar-item recommendations | List of one item ID. |
| Smart-search results | Free form text and/or dictionary of attributes. |
| User-affinity recommendations | List of multiple item IDs, or a user ID. |

Once the model is deployed, the machine learning service 160 and model to the filter/sorter UI element 131 using the configuration panel 140.

Later, the application development studio 110 may validate and bundle the metadata for the application being designed and then deploy the metadata to application services 170 such that the metadata can be retrieved by client applications and used in rendering the filter/sorter UI element 131 during runtime.

The techniques described with respect to FIG. 1 are advantageous as the training machine learning model is simplified for low-code/no-node developer and they seamless integrate machine learning services 160 with the application development studio 110, unlike prior machine learning integration in software application development which rely on professional data scientists to perform machine learning training and integration.

Figure 2:
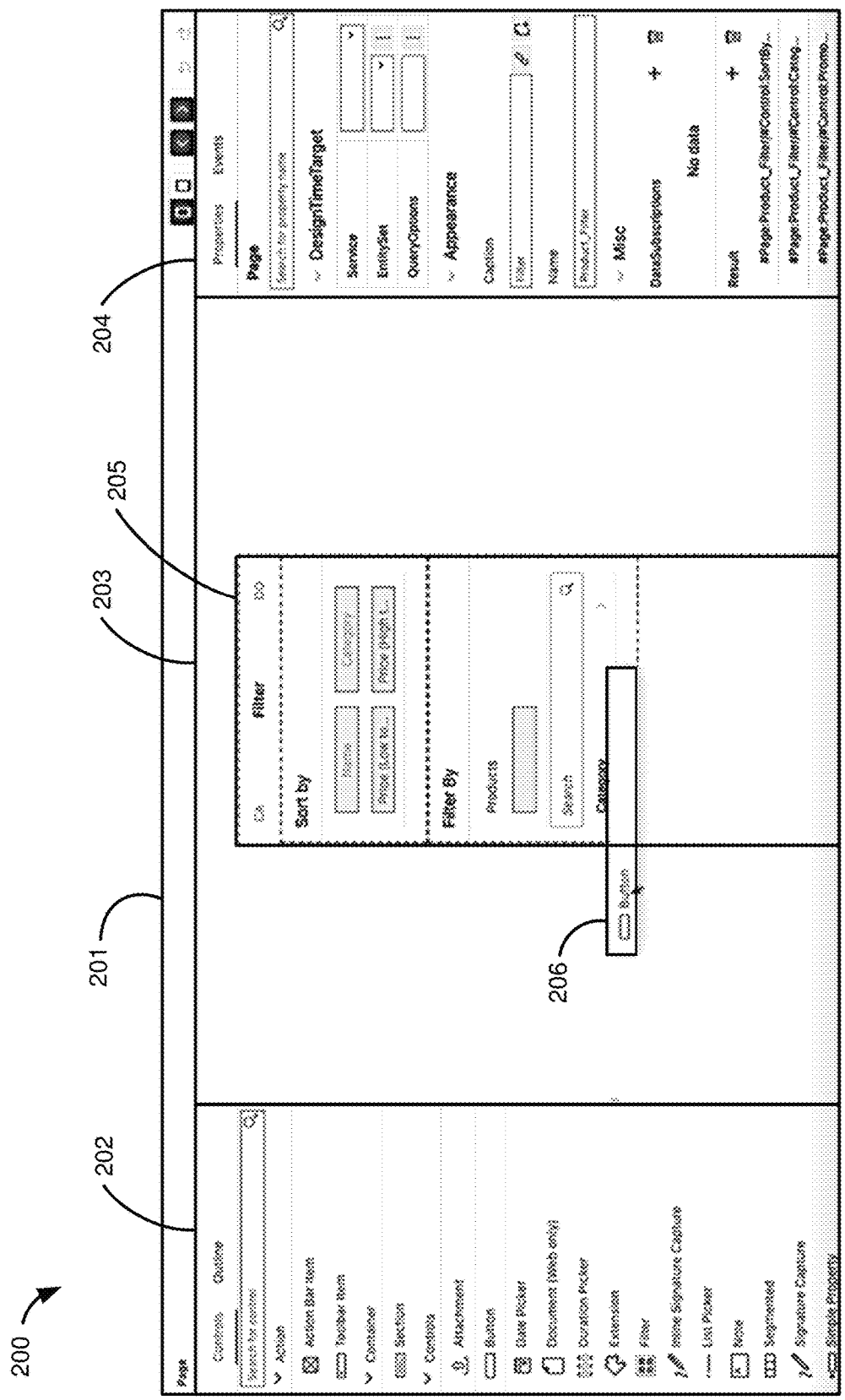
FIG. 2 shows a diagram of an exemplary graphical user interface for a low-code no-code application development studio providing machine learning integration, according to an embodiment.

FIG. 2 shows a diagram 200 of an exemplary graphical user interface 201 for a low-code no-code application development studio providing machine learning integration, according to an embodiment. This exemplary graphical user interface 201 may be provided by an application development software system, such as the low-code no-code application development studio 110 described above with respect to FIG. 1, for example.

The graphical user interface 201 includes a control panel 202, a canvas area 203, a configuration panel 204, and a filter/sorter user interface element 205. The control panel 202, canvas area 203, configuration panel 204, and filter/sorter user interface element 205 may be configured and operate similar to the control panel 120, canvas area 130, configuration panel 140, and filter/sorter user interface element 131 of FIG. 1, respectively.

Figure 3:
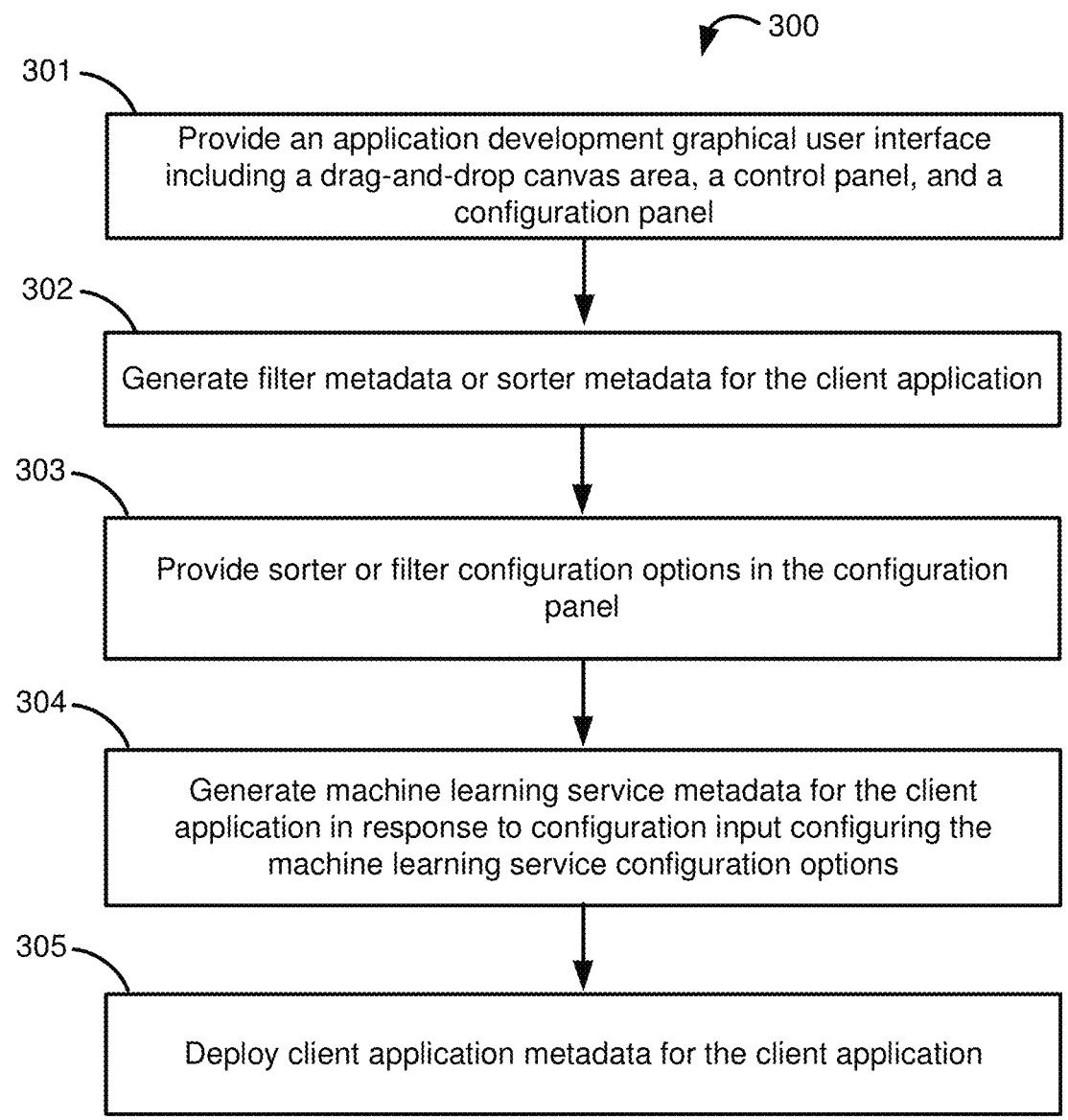
FIG. 3 shows a diagram of a method for integrating machine learning in software development, according to an embodiment.

FIG. 3 shows a diagram 300 of a method for integrating machine learning in software development, according to an embodiment. This method may be performed by an application development software system, such as the low-code no-code application development studio 110 described above with respect to FIG. 1, for example.

At 301, the method may provide an application development graphical user interface including a drag-and-drop canvas area, a control panel, and a configuration panel. In some embodiments, the control panel includes a plurality of available user interface elements configured to be dragged and dropped into the canvas area to design a client graphical user interface of a client application. The available user interface elements include a filter user interface element or a sorter user interface element. The filter user interface element is configurable to filter data within the client graphical user based on filtering options interface, The sorter user interface element configurable to sort data within the client graphical user based on sorting options. The configuration panel provides options and fields for configuring properties of user interface elements.

At 302, the method may generate filter metadata or sorter metadata for the client application. In some embodiments the method may generate filter metadata or sorter metadata for the client application, respectively, in response to the filter user interface element or the sorter user interface element being dragged from the control panel and being selected or dropped onto the canvas area. The filter metadata or sorter metadata configured to be parsed by the client application to render the filter user interface element or the sorter user interface element, respectively, in the client graphical user interface.

At 303, the method may provide sorter or filter configuration options in the configuration panel. In some embodiments the method may provide sorter or filter configuration options in the configuration panel in response to the filter user interface element or the sorter user interface element being selected or dropped onto the canvas area. The sorter or filter configuration options in the configuration panel include the filtering options or the sorting options and machine learning service configuration options. The filtering options or the sorting options may be added into the metadata generated in 302.

At 304, the method may generate machine learning service metadata for the client application in response to configuration input configuring the machine learning service configuration options. In some embodiments the machine learning service metadata may be configured to be parsed by the client application to obtain inferences from a machine learning model of a machine learning service.

At 305, the method may deploy client application metadata for the client application. The client application metadata may include the filter metadata or sorter metadata and the machine learning service metadata. The client application may be configured present recommendations based on the inferences and based on inputs to the filter user interface element or the sorter user interface element.

In some embodiments, the machine learning service metadata is generated in response to the configuration input. The configuration input is input by a user of the application development graphical user interface to the configuration panel. The machine learning service metadata is not manually coded or programmed by the user.

In some embodiments the method may provide training data to the machine learning service for training the machine learning model.

In some embodiments, the inferences from the machine learning model include a next-item recommendation, a similar-item recommendation, a smart-search result, or a user-affinity recommendation.

In some embodiments, the client application is a multi-experience application. The same client application metadata for the client application is usable to render both a mobile application client user interface and a web browser client application user interface.

In some embodiments, the application development graphical user interface, the machine learning service, and the client application are running on a cloud computing platform.

Figure 4:
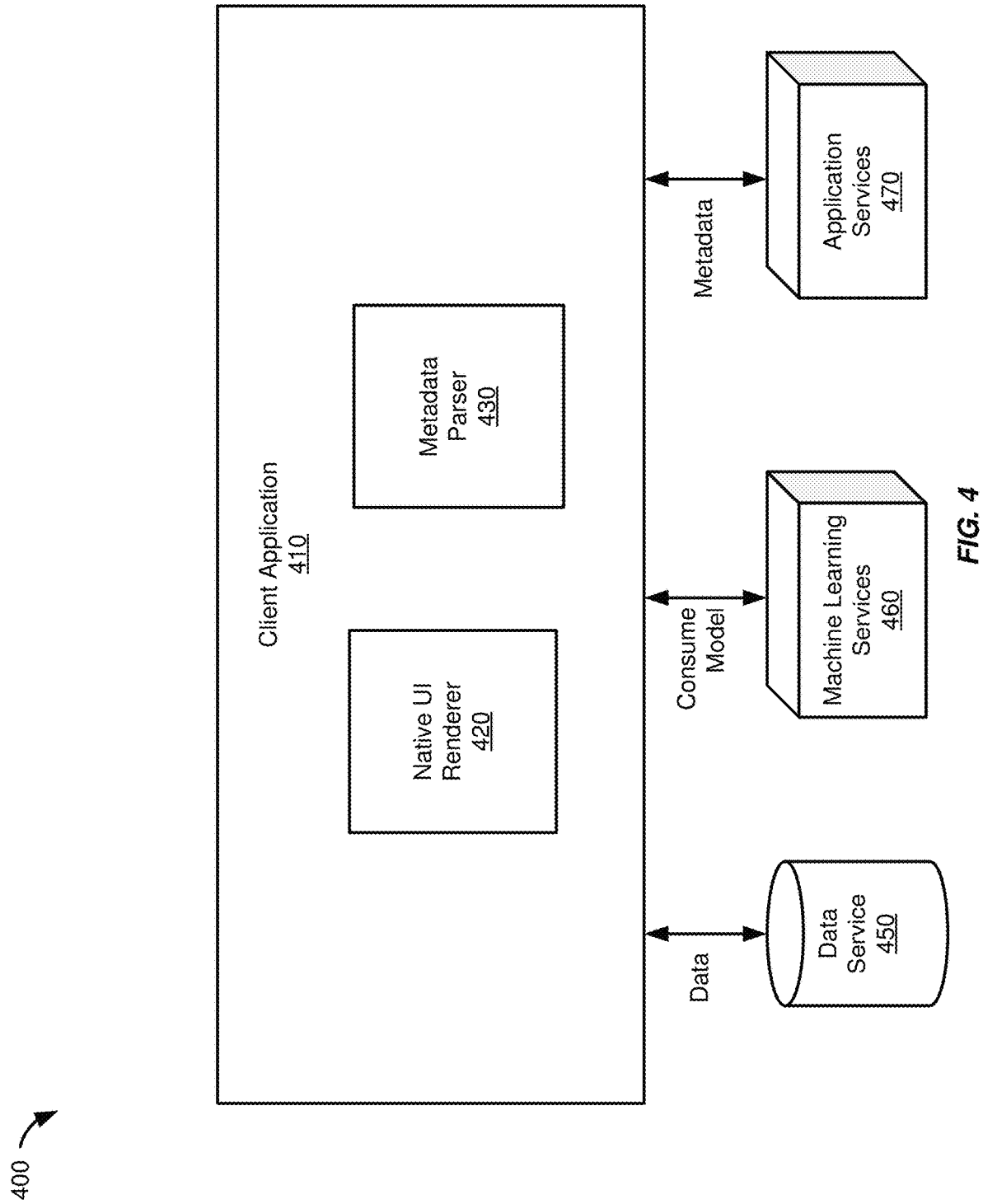
FIG. 4 shows a diagram of a client application that was designed using the application development studio, according to an embodiment.

FIG. 4 shows a diagram 400 of a client application 410 that was designed using the application development studio, according to an embodiment. The client application 410 is a runtime application of the application that was designed using the application development studio as described above.

The client application 410 includes a native user interface (UI) renderer 420 and a metadata parser 430. The client application 410 is also configured to connect to data service 450, machine learning services 460, and application services 470. The client application 410 is configured to receive metadata from the application services 470 and parse it using metadata parser 430. The client application is also configured to consume machine learning models provided by machine learning services 460. The client application 410 is also configured to bind to backend data service 450. In this way, the client application may provide personalized recommendation (based on the machine learning model) to the sorter and filter of the client application 410 and render (using native UI renderer 420) on different platforms.

An example workflow for the client application 410 is described below.

First a user may initialize the client application 410. Then the user may perform onboarding (e.g., log-on) and connect to application services 470. After connecting, the client application 410 may receive a metadata update push notification from the application services 470. Then the metadata parser 430 may parse the received metadata. After parsing the metadata, the native UI renderer 420 may render the sorter and filter in a user interface of the client application 410 using on the parsed metadata. The client application 410 can connect to the backend data service 450 and the machine learning services 460 and bind an API (e.g., a REST API) from the machine learning services 460 to the sorter and filter (which are rendered in the UI of the client application 410). The client application 410 can also bind data from the data services 450 to the sorter and filter. Then when data from the data services 450 is filtered or sorted, input can be provided to the machine learning services 460, which are input to machine learning models, and then recommendations output by the machine learning models may be provided to the client application 410 and rendered in its user interface.

Below is a simplified example of sorter to bind backend business data service to get data table of WorkOrder and consume the Personalized Recommendation ML service to get the Similarity value, then sort by OrderID (table key of WorkOrder) and the Similarity value.

```
{
  "Controls": [
    {
      "Sections": [
        {
          "Controls": [{
            "_Type": "Control.Type.FormCell.Sorter",
            "_Name": "SortFilter",
            "AllowEmptySelection": false,
            "Caption": "Sort By",
            "SortByItems": [
              {
                "ReturnValue": "OrderId desc",
                "DisplayValue": "OrderId Descending"
              },
              {
                "ReturnValue": "Similarity, OrderId",
                "DisplayValue": "SimilarItems (default ascending) and then OrderId (default ascending)"
              },
              "IsEditable":true
              "AIService":
"/MyMDKApp/Services/SimilarItems.service",
              "DataService":
"/MyMDKApp/Services/BusinessData.service"
            }]
          }
        ]
      }
    ]
  }
```

Below is a simplified example of filter to bind backend business data service to get data table of WorkOrder and consume the Personalized Recommendation ML service to get a list of Similarity items, then filter by range of OrderID and list of Similarity items.

```
"Sections": [
  {
    "Caption": "Filter",
    "Controls": [
      {
        "AllowMultipleSelection": true,
        "AllowEmptySelection": true,
        "Caption": "Filter By OrderId",
        "FilterProperty": [
          {
            "ReturnValue":
"/MDKDevApp/Globals/QueryString1.global",
            "DisplayValue": "OrderId > 4004760"
          },
          {
            "ReturnValue":
"/MDKDevApp/Rules/FilterQueries/SimilarItemsQuery.js",
            "DisplayValue": "Similar Items"
          },
        ],
        "_Name": "OrderId",
        "_Type": "Control.Type.FormCell.Filter",
        "IsEditable": true
        "AIService":
"/MyMDKApp/Services/SimilarItems.service",
        "DataService":
"/MyMDKApp/Services/BusinessData.service"
      }
    ]
  }
],
```

Example Hardware

Figure 5:
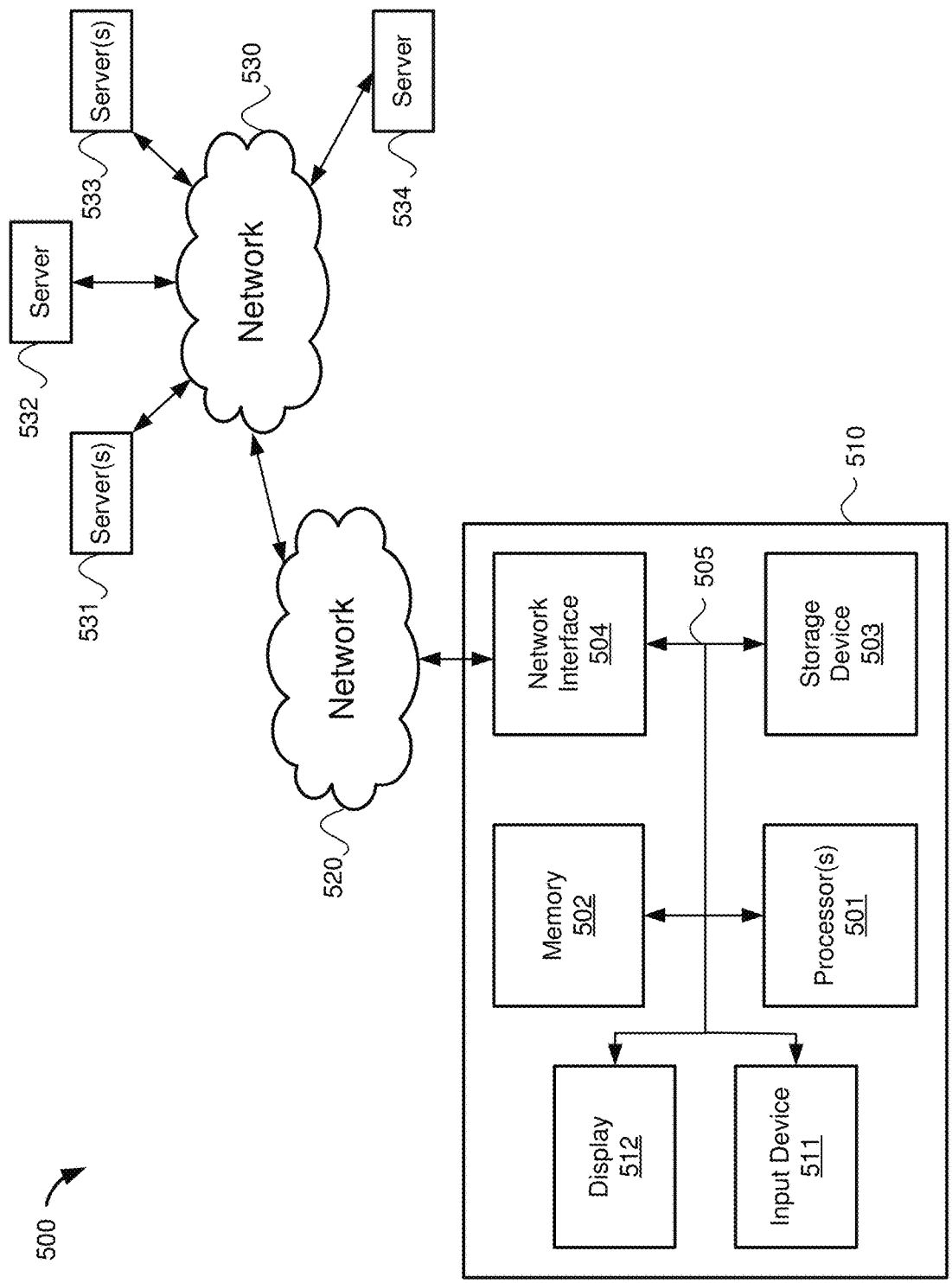
FIG. 5 shows a diagram of hardware of a special purpose computing machine for implementing systems and methods described herein.

FIG. 5 shows a diagram 500 of hardware of a special purpose computing machine for implementing systems and methods described herein. The following hardware description is merely one example. It is to be understood that a variety of computers topologies may be used to implement the above described techniques. The hardware shown in FIG. 5 may be used to implement the computer systems and computer software (computer reprogram code) described herein.

The computer system 510 includes a bus 505 or other communication mechanism for communicating information, and one or more processor(s) 501 coupled with bus 505 for processing information. The computer system 510 also includes a memory 502 coupled to bus 505 for storing information and instructions to be executed by processor 501, including information and instructions for performing some of the techniques described above, for example. This memory may also be used for storing programs executed by processor(s) 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 503 may include source code, binary code, or software files for performing the techniques above, for example. Storage device and memory are both examples of non-transitory computer readable storage mediums.

The computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses, for example.

The computer system also includes a network interface 504 coupled with bus 505. The network interface 504 may provide two-way data communication between computer system 510 and a network 520. The network interface 504 may be a wireless or wired connection, for example. The network 520 may be a local area network or an intranet, for example. The computer system 510 can send and receive information through the network interface 504, across the network 520, to computer systems connected to the Internet 530. Using the Internet 530 the computer system 510 may access data and features that reside on multiple different hardware servers 531-534. The servers 531-534 may be part of a cloud computing environment in some embodiments.

EXAMPLE EMBODIMENTS

Various example embodiments implementing the techniques discussed above are described below.

Some embodiments provide a computer system, comprising one or more processors and one or more machine-readable medium coupled to the one or more processors, and storing computer program code comprising sets instructions executable by the one or more processors. The instructions are executable to provide an application development graphical user interface including a drag-and-drop canvas area, a control panel, and a configuration panel. The control panel includes a plurality of available user interface elements configured to be dragged and dropped into the canvas area to design a client graphical user interface of a client application. The available user interface elements include a filter user interface element or a sorter user interface element. The filter user interface element is configurable to filter data within the client graphical user based on filtering options interface. The sorter user interface element configurable to sort data within the client graphical user based on sorting options. The configuration panel provides options and fields for configuring properties of user interface elements.

The instructions are further executable to generate filter metadata or sorter metadata for the client application, respectively, in response to the filter user interface element or the sorter user interface element being arranged on the canvas area. The filter metadata or sorter metadata are configured to be parsed by the client application to render the filter user interface element or the sorter user interface element, respectively, in the client graphical user interface.

The instructions are further executable to provide sorter or filter configuration options in the configuration panel in response to the filter user interface element or the sorter user interface element being arranged on the canvas area. The sorter or filter configuration options in the configuration panel including the filtering options or the sorting options and machine learning service configuration options.

The instructions are further executable to generate machine learning service metadata for the client application in response to configuration input configuring the machine learning service configuration options. The machine learning service metadata configured to be parsed by the client application to obtain inferences from a machine learning model of a machine learning service.

The instructions are further executable to deploy client application metadata for the client application. The client application metadata including the filter metadata or sorter metadata and the machine learning service metadata. The client application configured to present recommendations based on the inferences and based on inputs to the filter user interface element or the sorter user interface element.

In some embodiments of the computer system, the configuration input includes an identifier of the machine learning service.

In some embodiments of the computer system, the instructions are further executable to provide training data to the machine learning service for training the machine learning model.

In some embodiments of the computer system, the inferences from the machine learning model include a next-item recommendation, a similar-item recommendation, a smart-search result, or a user-affinity recommendation.

In some embodiments of the computer system, the client application is a multi-experience application. The same client application metadata for the client application may be usable to render both a mobile application client user interface and a web browser client application user interface.

In some embodiments of the computer system, the application development graphical user interface, the machine learning service, and the client application are running on a cloud computing platform.

In some embodiments of the computer system, the control panel and the configuration panel are portions of a same user interface panel.

In some embodiments of the computer system, the client application is configured to provide a list of items being filtered or sorted by the client application to the machine learning service, and wherein the machine learning model provides next-item recommendations or similar-item recommendations for the list of items being filtered or sorted by the client application.

Some embodiments provide one or more non-transitory computer-readable medium storing computer program code. The computer program code comprises sets of instructions to provide an application development graphical user interface including a drag-and-drop canvas area, a control panel, and a configuration panel. The control panel includes a plurality of available user interface elements configured to be dragged and dropped into the canvas area to design a client graphical user interface of a client application. The available user interface elements including a filter user interface element or a sorter user interface element. The filter user interface element is configurable to filter data within the client graphical user based on filtering options interface, The sorter user interface element configurable to sort data within the client graphical user based on sorting options. The configuration panel providing options and fields for configuring properties of user interface elements.

The computer program code comprises further sets of instructions to generate filter metadata or sorter metadata for the client application, respectively, in response to the filter user interface element or the sorter user interface element being arranged on the canvas area, the filter metadata or sorter metadata configured to be parsed by the client application to render the filter user interface element or the sorter user interface element, respectively, in the client graphical user interface.

The computer program code comprises further sets of instructions to provide sorter or filter configuration options in the configuration panel in response to the filter user interface element or the sorter user interface element being arranged on the canvas area. The sorter or filter configuration options in the configuration panel include the filtering options or the sorting options and machine learning service configuration options.

The computer program code comprises further sets of instructions to generate machine learning service metadata for the client application in response to configuration input configuring the machine learning service configuration options. The machine learning service metadata is configured to be parsed by the client application to obtain inferences from a machine learning model of a machine learning service.

The computer program code comprises further sets of instructions to deploy client application metadata for the client application. The client application metadata includes the filter metadata or sorter metadata and the machine learning service metadata. The client application configured to present recommendations based on the inferences and based on inputs to the filter user interface element or the sorter user interface element.

In some embodiments of non-transitory computer-readable medium, the configuration input includes an identifier of the machine learning service.

In some embodiments of non-transitory computer-readable medium, the configuration input is input by a user of the application development graphical user interface to the configuration panel. In some embodiments this machine learning service metadata is not manually coded by programmed by the user.

In some embodiments of the non-transitory computer-readable medium, the computer program code further comprises sets of instructions to provide training data to the machine learning service for training the machine learning model.

In some embodiments of the non-transitory computer-readable medium, the inferences from the machine learning model include a next-item recommendation, a similar-item recommendation, a smart-search result, or a user-affinity recommendation.

In some embodiments of the non-transitory computer-readable medium, the client application is a multi-experience application, wherein the same client application metadata for the client application is usable to render both a mobile application client user interface and a web browser client application user interface.

In some embodiments of the non-transitory computer-readable medium, the application development graphical user interface, the machine learning service, and the client application are running on a cloud computing platform.

In some embodiments of the non-transitory computer-readable medium, the client application is configured to provide a list of items being filtered or sorted by the client application to the machine learning service, and wherein the machine learning model provides next-item recommendations or similar-item recommendations for the list of items being filtered or sorted by the client application.

In some embodiments of the non-transitory computer-readable medium the control panel and the configuration panel are portions of a same user interface panel.

Some embodiments provide a computer-implemented method. The method includes providing an application development graphical user interface including a drag-and-drop canvas area, a control panel, and a configuration panel. The control panel includes a plurality of available user interface elements configured to be dragged and dropped into the canvas area to design a client graphical user interface of a client application. The available user interface elements include a filter user interface element or a sorter user interface element. The filter user interface element is configurable to filter data within the client graphical user based on filtering options interface, The sorter user interface element configurable to sort data within the client graphical user based on sorting options. The configuration panel provides options and fields for configuring properties of user interface elements.

The method further includes generating filter metadata or sorter metadata for the client application, respectively, in response to the filter user interface element or the sorter user interface element being arranged on the canvas area. The filter metadata or sorter metadata configured to be parsed by the client application to render the filter user interface element or the sorter user interface element, respectively, in the client graphical user interface.

The method further includes providing sorter or filter configuration options in the configuration panel in response to the filter user interface element or the sorter user interface element being arranged on the canvas area. The sorter or filter configuration options in the configuration panel include the filtering options or the sorting options and machine learning service configuration options.

The method further includes generating machine learning service metadata for the client application in response to configuration input configuring the machine learning service configuration options. The machine learning service metadata configured to be parsed by the client application to obtain inferences from a machine learning model of a machine learning service.

The method further includes deploying client application metadata for the client application, the client application metadata including the filter metadata or sorter metadata and the machine learning service metadata. The client application configured to present recommendations based on the inferences and based on inputs to the filter user interface element or the sorter user interface element.

In some embodiments of the computer-implemented method, the configuration input includes an identifier of the machine learning service.

In some embodiments the computer-implemented method further comprises providing training data to the machine learning service for training the machine learning model.

In some embodiments of the computer-implemented method, the inferences from the machine learning model include a next-item recommendation, a similar-item recommendation, a smart-search result, or a user-affinity recommendation.

In some embodiments of the computer-implemented method, the client application is a multi-experience application. The same client application metadata for the client application is usable to render both a mobile application client user interface and a web browser client application user interface.

In some embodiments of the computer-implemented method, the application development graphical user interface, the machine learning service, and the client application are running on a cloud computing platform.

In some embodiments of the computer-implemented method, the client application is configured to provide a list of items being filtered or sorted by the client application to the machine learning service, and wherein the machine learning model provides next-item recommendations or similar-item recommendations for the list of items being filtered or sorted by the client application.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
one or more processors;
one or more machine-readable medium coupled to the one or more processors and storing computer program code comprising sets of instructions executable by the one or more processors to:
provide an application development graphical user interface including a drag-and-drop canvas area, a control panel, and a configuration panel, the control panel including a plurality of available user interface elements configured to be dragged and dropped into the canvas area to design a client graphical user interface of a client application, the available user interface elements including a filter user interface element or a sorter user interface element, the filter user interface element configurable to filter data within the client graphical user interface based on filtering options, the sorter user interface element configurable to sort data within the client graphical user interface based on sorting options, the configuration panel providing options and fields for configuring properties of user interface elements;
generate filter metadata or sorter metadata for the client application, respectively, in response to the filter user interface element or the sorter user interface element being arranged on the canvas area, the filter metadata or sorter metadata configured to be parsed by the client application to render the filter user interface element or the sorter user interface element, respectively, in the client graphical user interface;
present sorter or filter configuration options in the configuration panel in response to the filter user interface element or the sorter user interface element being arranged on the canvas area, the sorter or filter configuration options in the configuration panel including the filtering options or the sorting options and machine learning service configuration options, the machine learning service configuration options included in the sorter or filter configuration options comprising options for training and/or accessing a machine learning model of a machine learning service that provides recommendations based on the data filtered or sorted via the filter user interface element or the sorter user interface element;
in response to configuration input configuring the machine learning service configuration options:
provide training data to the machine learning service for training the machine learning model; and
generate machine learning service metadata for the client application, the machine learning service metadata configured to be parsed by the client application to obtain inferences from the machine learning model of the machine learning service; and
deploy client application metadata for the client application, the client application metadata including the filter metadata or sorter metadata and the machine learning service metadata, the client application configured to present the recommendations provided by the machine learning model based on the inferences and the data filtered or sorted via the filter user interface element or the sorter user interface element.

2. The computer system of claim 1, the configuration input including an identifier of the machine learning service.

3. The computer system of claim 1, wherein the recommendations provided by the machine learning model include a next-item recommendation, a similar-item recommendation, a smart-search result, or a user-affinity recommendation.

4. The computer system of claim 1, wherein the client application is a multi-experience application, wherein a same client application metadata for the client application is usable to render both a mobile application client user interface and a web browser client application user interface.

5. The computer system of claim 1, wherein the application development graphical user interface, the machine learning service, and the client application are running on a cloud computing platform.

6. The computer system of claim 1, wherein the client application is configured to provide a list of items being filtered or sorted by the client application to the machine learning service, and wherein the machine learning model provides next-item recommendations or similar-item recommendations for the list of items being filtered or sorted by the client application.

7. A non-transitory computer-readable medium storing computer program code comprising sets of instructions to:
provide an application development graphical user interface including a drag-and-drop canvas area, a control panel, and a configuration panel, the control panel including a plurality of available user interface elements configured to be dragged and dropped into the canvas area to design a client graphical user interface of a client application, the available user interface elements including a filter user interface element or a sorter user interface element, the filter user interface element configurable to filter data within the client graphical user interface based on filtering options interface, the sorter user interface element configurable to sort data within the client graphical user interface based on sorting options, the configuration panel providing options and fields for configuring properties of user interface elements;

generate filter metadata or sorter metadata for the client application, respectively, in response to the filter user interface element or the sorter user interface element being arranged on the canvas area, the filter metadata or sorter metadata configured to be parsed by the client application to render the filter user interface element or the sorter user interface element, respectively, in the client graphical user interface;

present sorter or filter configuration options in the configuration panel in response to the filter user interface element or the sorter user interface element being arranged on the canvas area, the sorter or filter configuration options in the configuration panel including the filtering options or the sorting options and machine learning service configuration options, the machine learning service configuration options included in the sorter or filter configuration options comprising options for training and/or accessing a machine learning model of a machine learning service that provides recommendations based on the data filtered or sorted via the filter user interface element or the sorter user interface element, the recommendations provided by the machine learning model including a next-item recommendation, a similar-item recommendation, a smart-search result, or a user-affinity recommendation;

generate machine learning service metadata for the client application in response to configuration input configuring the machine learning service configuration options, the machine learning service metadata configured to be parsed by the client application to obtain inferences from the machine learning model of the machine learning service; and deploy client application metadata for the client application, the client application metadata including the filter metadata or sorter metadata and the machine learning service metadata, the client application configured to present the recommendations provided by the machine learning model based on the inferences and the data filtered or sorted via the filter user interface element or the sorter user interface element.

8. The non-transitory computer-readable medium of claim 7, the configuration input including an identifier of the machine learning service.

9. The non-transitory computer-readable medium of claim 7, wherein the computer program code further comprises sets of instructions to:
provide training data to the machine learning service for training the machine learning model.

10. The non-transitory computer-readable medium of claim 7, wherein the client application is a multi-experience application, wherein a same client application metadata for the client application is usable to render both a mobile application client user interface and a web browser client application user interface.

11. The non-transitory computer-readable medium of claim 7, wherein the application development graphical user interface, the machine learning service, and the client application are running on a cloud computing platform.

12. The non-transitory computer-readable medium of claim 7, wherein the client application is configured to provide a list of items being filtered or sorted by the client application to the machine learning service, and wherein the machine learning model provides next-item recommendations or similar-item recommendations for the list of items being filtered or sorted by the client application.

13. A computer-implemented method, comprising:
providing an application development graphical user interface including a drag-and-drop canvas area, a control panel, and a configuration panel, the control panel including a plurality of available user interface elements configured to be dragged and dropped into the canvas area to design a client graphical user interface of a client application, the available user interface elements including a filter user interface element or a sorter user interface element, the filter user interface element configurable to filter data within the client graphical user based on filtering options interface, the sorter user interface element configurable to sort data within the client graphical user interface based on sorting options, the configuration panel providing options and fields for configuring properties of user interface elements;

determining that the filter user interface element or the sorter user interface elements has been arranged on the canvas area;

in response to the determining:
generating filter metadata or sorter metadata for the client application, respectively, the filter metadata or sorter metadata configured to be parsed by the client application to render the filter user interface element or the sorter user interface element, respectively, in the client graphical user interface; and presenting sorter or filter configuration options in the configuration panel, the sorter or filter configuration options in the configuration panel including the filtering options or the sorting options and machine learning service configuration options, the machine learning service configuration options included in the sorter or filter configuration options comprising options for training and/or accessing a machine learning model of a machine learning service that provides recommendations based on the data filtered or sorted via the filter user interface element or the sorter user interface element;

receiving configuration input for configuring the machine learning service configuration operations;

in response to the receiving, generating machine learning service metadata for the client application, the machine learning service metadata configured to be parsed by the client application to obtain inferences from the machine learning model of the machine learning service; and deploying client application metadata for the client application, the client application metadata including the filter metadata or sorter metadata and the machine learning service metadata, wherein the client application is configured to provide a list of items being filtered or sorted by the client application to the machine learning service and present the recommendations provided by the machine learning model based on the inferences and the list of items, and wherein the recommendations include next-item recommendations or similar-item recommendations for the list of items.

14. The computer-implemented method of claim 13, wherein the configuration input includes an identifier of the machine learning service.

15. The computer-implemented method of claim 13, further comprising:
    providing training data to the machine learning service for training the machine learning model.

16. The computer-implemented method of claim 13, wherein the recommendations provided by the machine learning model further include a smart-search result or a user-affinity recommendation.

17. The computer-implemented method of claim 13, wherein the client application is a multi-experience application, wherein a same client application metadata for the client application is usable to render both a mobile application client user interface and a web browser client application user interface.

\* \* \* \* \*